No. 718,864. PATENTED JAN. 20, 1903.
A. J. NORTHCRAFT.
SHOOTING GALLERY TARGET.
APPLICATION FILED APR. 29, 1902.
NO MODEL. 2 SHEETS—SHEET 1.
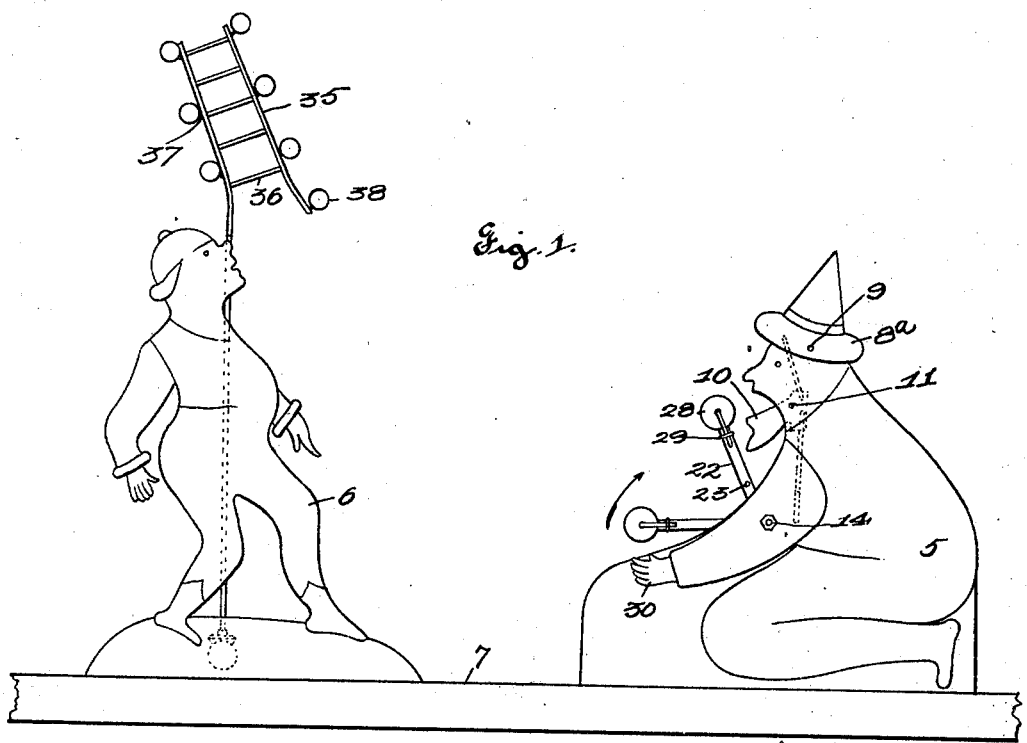
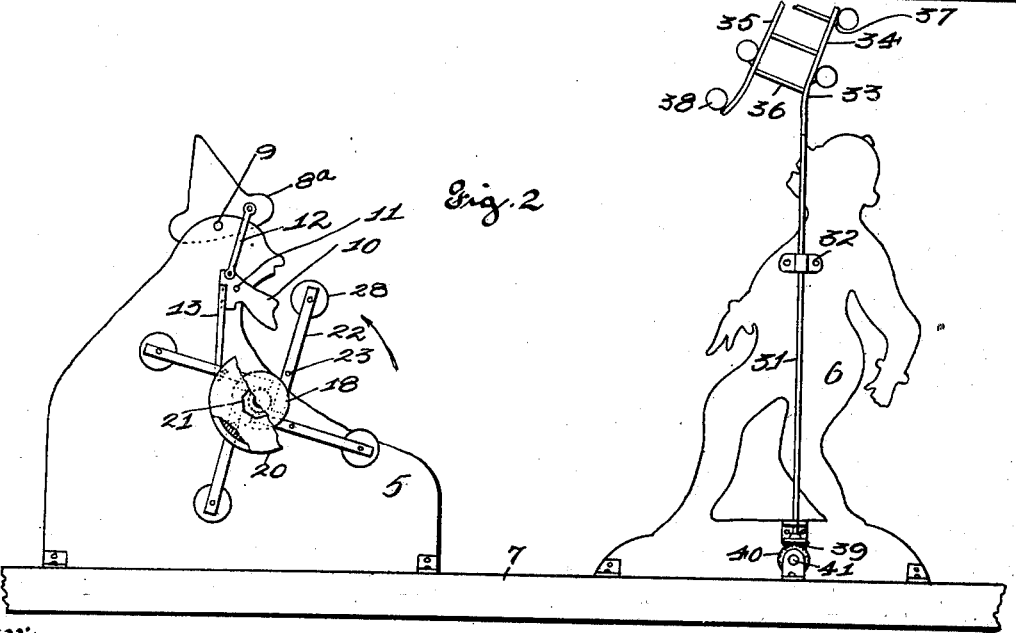
Witnesses. Inventor
Alfred A. Eicks Ambro J. Northcraft
M. G. Irion by Higdon & Longan Att'ys No. 718,864. PATENTED JAN. 20, 1903.
A. J. NORTHCRAFT.
SHOOTING GALLERY TARGET.
APPLICATION FILED APR. 29, 1902.
NO MODEL. 2 SHEETS—SHEET 2.

Witnesses
Alfred O'Ericker
[signature]

Inventor
Ambro J. Northcraft,
by Higdon & Longan attys

UNITED STATES PATENT OFFICE.

AMBRO J. NORTHCRAFT, OF ST. LOUIS, MISSOURI.

SHOOTING-GALLERY TARGET.

SPECIFICATION forming part of Letters Patent No. 718,864, dated January 20, 1903.

Application filed April 29, 1902. Serial No. 105,236. (No model.)

*To all whom it may concern:*

Be it known that I, AMBRO J. NORTHCRAFT, of the city of St. Louis, State of Missouri, have invented certain new and useful Improvements in Shooting-Gallery Targets, of which the following is a full, clear, and exact description, reference being had to the accompanying drawings, forming a part hereof.

My object is to construct an improved shooting-gallery target; and my invention consists of a suitable base, figures of men and the like mounted upon the base, frames mounted upon the figures, mechanism for moving the frames, and frangible targets adapted to be connected to the frames and moved therewith so as to produce a plurality of animated targets.

Figure 3:
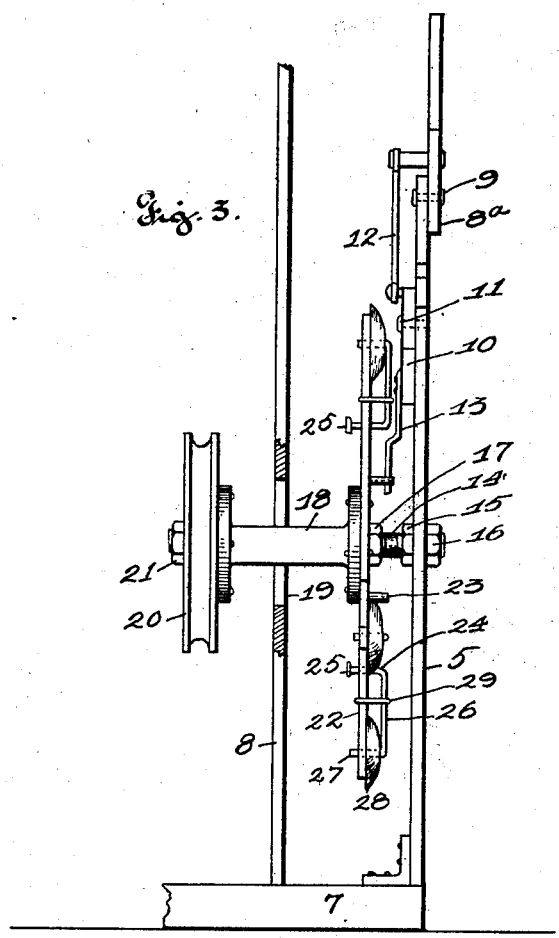
Figure 4:
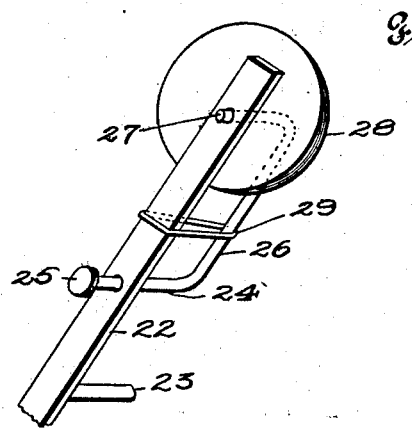

Figure 1 is a front elevation. Fig. 2 is a rear elevation of the parts shown in Fig. 1. Fig. 3 is an edge view of the right-hand figure shown in Fig. 1. Fig. 4 is a perspective of one of the frames carrying a frangible target and showing the means of removing and replacing the target.

Referring to the drawings in detail, the figures 5 and 6 are mounted upon the base 7 in front of the wall 8. The figure 5 is an imitation of a crouching man and has a hat, figure 8ª, mounted in position on the pivot 9 and the lower jaw, figure 10, mounted in position upon the pivot 11. The rear end of the jaw is connected to the forward end of the hat by the connecting-rod 12, so that when the forward end of the jaw goes down to give the appearance of opening the mouth the forward part of the hat is elevated. An arm 13 is rigidly fixed to the jaw 10 and extends downwardly. A stub-shaft 14 is inserted through the figure 5 and held in position by nuts 15 and 16, said shaft extending backwardly from the wall 8. A third nut 17 is fixed upon the shaft to form a stop for the spool 18, which is rotatably mounted upon the shaft and extends backwardly through the opening 19 in the wall 8. A grooved driving-pulley 20 is fixed to the rear end of the spool 18, and a nut 21 upon the rear end of the shaft 14 holds the pulley in position. Arms 22 extend tangentially from the forward end of the spool 18, and pins 23 project from said arms 22 in position to engage the lower end of the arm 13, as required to operate said arm 13 to lower the jaw and raise the hat. The weight of the connecting-rod 12 overbalances the jaw and hat, so that as soon as a pin 23 passes the arm 22 the hat will be lowered and the jaw elevated.

Each target-holder comprises a horizontal portion 24, slidingly mounted through an arm 22 and having a head 25 upon one end to form a stop, the vertical portion 26, extending outwardly from the opposite end of the portion 25, and a horizontal portion 27, slidingly mounted through the extreme outer end of the arm 22, as shown in Fig. 4. The portion 24 is longer than the portion 27, so that when the stop 25 is in engagement with the arm 22 the end of the portion 27 is withdrawn from the arm 22. Then said portion 27 is inserted through the hemispherical frangible target 28 and again inserted in the end of the arm 22. A rubber band 29 is placed around the arm 22 and the portion 26 to hold the target-holder in position to support the target 28. A driving belt or cord is placed around the pulley 20, and the driving of the pulley operates the target to rotate the frame in the direction indicated by the arrow, and this gives the appearance of the targets passing upwardly from the hand 30 and into the mouth of the figure. If the marksman succeeds in hitting the target, it is broken, and new targets may be supplied by stretching the rubber band 29 to move the portion 27 of the target-holder out of engagement with the arm 22. The figure 6 is an imitation of an acrobat or circus performer. The shaft 31 is secured in a vertical position against the rear side of the figure by means of brackets 32 and extends upwardly to the point above the head of the figure and then is bent to an angle of about ten degrees at the point 33, thus producing the ladder member 34, and a corresponding member 35 is connected to the member 34 by the rounds 36 to produce an imitation ladder. Pins 37 extend outwardly from the members 34 and 35, and the frangible targets 38 are removably mounted upon said pins. A beveled gear 39 is fixed upon the lower end of the shaft 31 and meshes with the beveled gear 40 upon the horizontal shaft 41. A pulley is fixed upon the shaft 41 and driven in the same manner as the pulley 20.

I claim—

1. A shooting-gallery target comprising a suitable base; figures of men and the like mounted upon the base; frames mounted upon the figures; mechanism for moving the frames; and frangible targets connected to the frames and moved therewith to produce a plurality of animated targets, substantially as specified.

2. A shooting-gallery target comprising a suitable fixed figure; a frame revolving in full view all the time; frangible targets mounted upon the frame; and means of revolving the frame, substantially as specified.

3. A shooting-gallery target comprising a suitable figure of a man having movable parts; a frame; frangible targets mounted upon the frame; and means of moving the frame, substantially as specified.

4. A shooting-gallery target comprising a suitable fixed figure having a moving jaw; a frame; frangible targets mounted upon the frame; and means of moving the frame, substantially as specified.

In testimony whereof I affix my signature in presence of two witnesses.

AMBRO J. NORTHCRAFT.

Witnesses:
 ALFRED A. EICKS,
 M. G. IRION.